May 22, 1951  H. A. STAMPER  2,553,951
POSITIONING MECHANISM
Filed Jan. 30, 1946  2 Sheets—Sheet 1
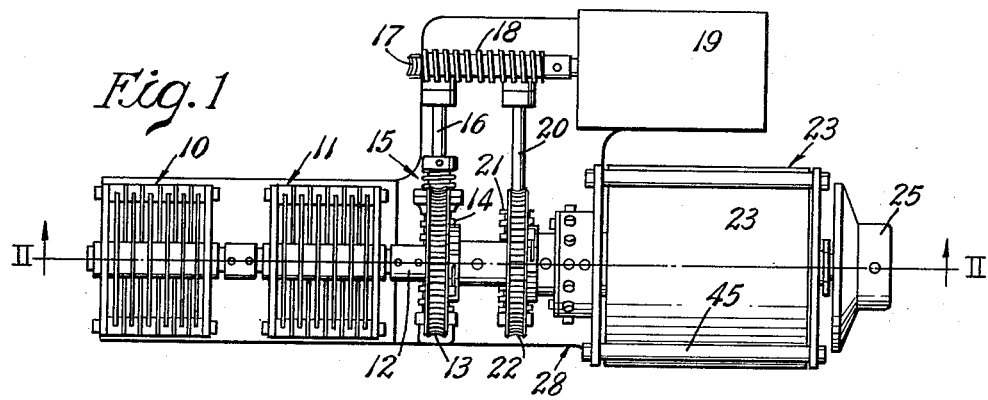
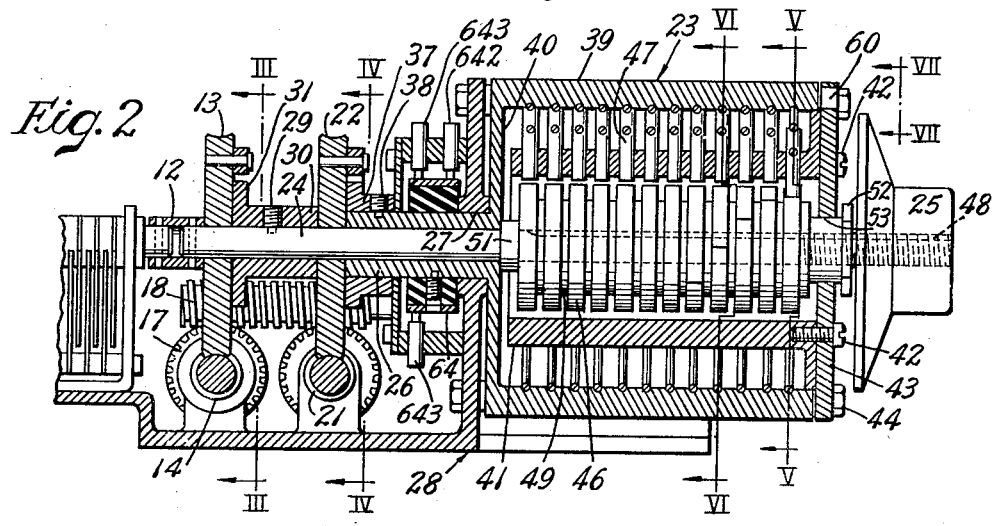
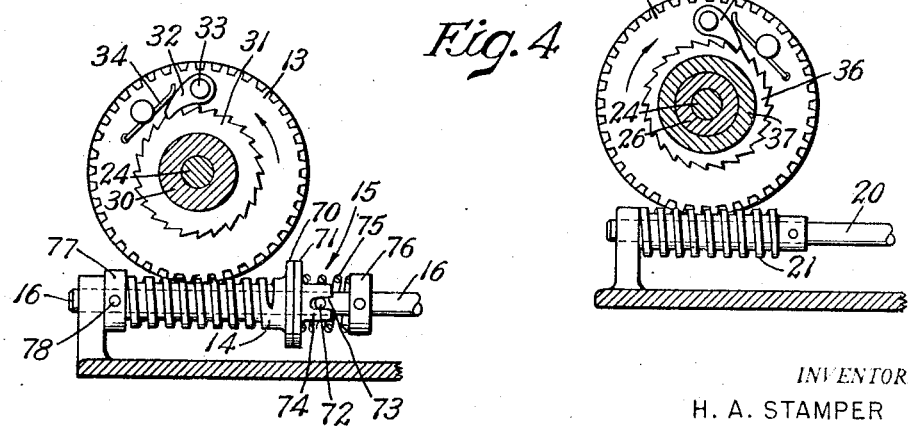
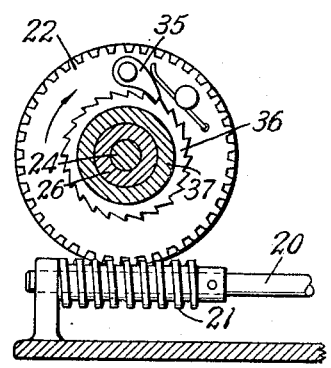
INVENTOR.
H. A. STAMPER
BY
ATTORNEY May 22, 1951          H. A. STAMPER          2,553,951
POSITIONING MECHANISM
Filed Jan. 30, 1946          2 Sheets-Sheet 2
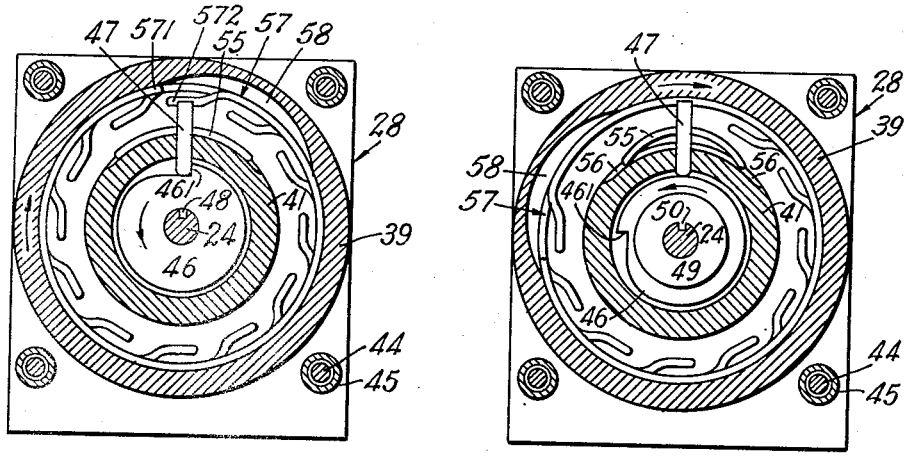
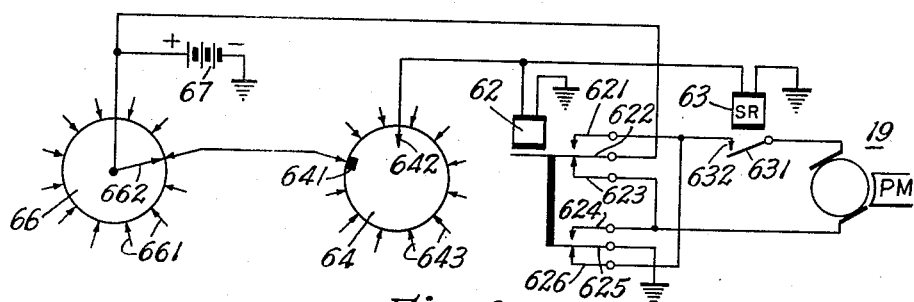
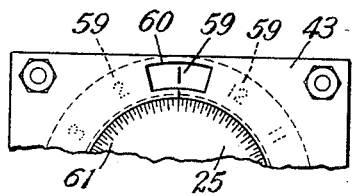
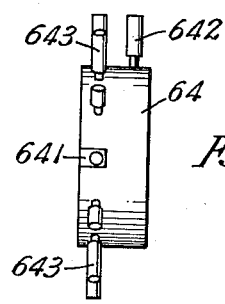
INVENTOR.
H. A. STAMPER
BY *E. Woodbury*
ATTORNEY Patented May 22, 1951

2,553,951

UNITED STATES PATENT OFFICE 2,553,951

POSITIONING MECHANISM

Hamilton A. Stamper, Los Angeles, Calif., assignor to Bendix Aviation Corporation, South Bend, Ind., a corporation of Delaware Application January 30, 1946, Serial No. 644,276

4 Claims. (Cl. 192—142)

This invention relates to mechanisms for preselecting any one of a plurality of predetermined angular positions of a rotatable member, and automatically moving the member exactly into the selected position. The invention is particularly useful for turning a variable condenser or the like into various preselected positions for tuning radio apparatus to preselected frequency bands.

An object of the invention is to provide a preselecting mechanism that is capable of selecting a plurality of positions and is simple, reliable, compact, and quiet.

Another object is to provide a preselecting mechanism in which a plurality of members can be actuated into selected predetermined positions by a single driving motor.

Another object is to provide a multi-position preselecting mechanism that can be readily adjusted to provide a plurality of selectable positions of rotation, each of which positions may lie at any point within the limits of total angular movement of the mechanism, irrespective of the angular location of the other selectable positions.

Another object is to provide a preselecting mechanism that can be mounted back of a panel, with a position-indicating dial mounted in front of the panel on a shaft extending through the panel, in which adjustments to determine the positions to be preselected can be made by operations performed entirely at the front side of the panel, thereby eliminating any need of obtaining access to the mechanism positioned back of the panel.

Other more specific objects and features of the invention will become apparent from the description to follow of a particular embodiment thereof.

Briefly, in accordance with the present invention, a shaft to be accurately positioned in any one of a plurality of selectable angular positions is rotated into a desired position and accurately stopped by one of a plurality of selectable stop mechanisms, the rotation being effected by the application of a limited torque insufficient to overcome the stop mechanism. Further in accordance with the invention, the stop mechanism may comprise a plurality of longitudinally spaced rotatable stop elements on the shaft, each cooperating with a separate non-rotatable stop element. The arrangement is such that any one of the non-rotatable stop elements can be rendered operable and all the rest rendered inoperable, to enable the selection of a desired position. The exact position in which each pair of cooperating stop elements stop the shaft can be adjusted by rotating the rotatable stop element relative to the shaft, and thereafter locking it against rotation with respect to the shaft.

A very useful feature of the invention is a mechanism whereby all of the rotatable stop elements can be locked to or released from the shaft by an operation that is performed at one end of the shaft, which may project through a panel, so that the setting of the rotatable elements can be performed without having access to the main portion of the mechanism located back of the panel.

Another useful feature of the invention is the selection of the stationary stop elements by means of a rotatable selection member co-axial with the shaft, in combination with a simple mechanism whereby a single motor can be employed to first rotate the selecting member into the proper position for a desired position, and thereafter rotating the shaft until it is stopped by the selected stop element.

Referring to the drawing:

Fig. 1 is a plan view of a preselecting mechanism incorporating the invention for rotating a variable condenser into predetermined positions.

Fig. 2 is a vertical section of a portion of the mechanism shown in Fig. 1, the section being taken in the plane II—II of Fig. 1.

Fig. 3 is a cross section taken in the plane III—III of Fig. 2.

Fig. 4 is a cross section taken in the plane IV—IV of Fig. 2.

Fig. 5 is a cross section taken along the line V—V of Fig. 2.

Fig. 6 is a cross section taken along the line VI—VI of Fig. 2.

Fig. 7 is a detail elevation view looking in the direction of the arrow VII—VII in Fig. 2.

Fig. 8 is a detail view of a portion of the face of the commutator in the apparatus of Fig. 2; and Fig. 9 is a schematic diagram of the electrical circuit of the apparatus.

Referring first to Fig. 1, there are shown a pair of variable condensers 10 and 11, having interconnected aligned shafts which are adapted to be rotated by a coupling 12. The coupling 12 in turn is adapted to be rotated by a worm wheel 13 driven by a worm 14, which in turn is rotated through a slip clutch 15 by a shaft 16. The shaft 16 has a worm wheel 17 thereon which is driven by a worm 18 on the shaft of a reversible electric motor 19.

The worm 18 also drives a worm wheel (not visible in the drawing) on a shaft 20, which carries a worm 21 meshing with a worm wheel 22, which is co-axial with the worm wheel 13.

As shown in Fig. 3 the slip clutch 15 may consist of a clutch disc 70 on the end of the worm 14, which is engaged by a clutch disc 71, which is slidable longitudinally on the shaft 16 but is forced to rotate with the shaft by a pin 72 which extends through the shaft 16 and through slots 73 in a hub 74 on the disc 71. A helical compression spring 75 compressed between the clutch disc 71 and a collar 76 on the shaft 16 maintains the clutch disc 71 in functional engagement with the disc 70. A collar 77, pinned to the shaft 16 by a pin 78 takes the thrust of the spring 75 on the worm 14.

As will appear later in the description of operation, the motor 19 is first rotated in one direction to rotate the worm wheel 22 in one direction into a desired selecting position, after which the motor is reversed to drive the worm wheel 13, the coupling 12, and the condenser shafts in the opposite direction until they are stopped by a selecting mechanism 23. This selecting mechanism 23 is controlled by the worm wheel 22 to select any one of a plurality of positions in which it stops the worm wheel 13 and the condenser shafts.

The worm wheels 13 and 22 both rotate in unison in one direction or the other, according to the direction of rotation of the motor 19, but it is desired that the selecting mechanism 23 be rotated only in response to the initial rotation of the motor 19 in one direction, and that the coupling 12 and the condenser shafts be rotated only in the other direction in response to rotation of the motor 19 in the other direction. Therefore, the worm wheel 22 is coupled to the selecting mechanism 23 through a one-way clutch, and the worm wheel 13 is connected to the coupling 12 through a separate one-way clutch.

Thus referring to Fig. 2, the worm wheel 13 is loosely mounted for rotation on a main shaft 24 which is connected to the coupling 12, and extends from the coupling through the selecting mechanism 23, and has a dial 25 on its opposite end. This shaft 24 is rotatably supported by a sleeve 26, which in turn is rotatably supported in a bearing 27 in a stationary frame 28. Secured to the shaft 24, as by a set screw 29, is a hub 30, which serves as a spacer element to longitudinally position the worm wheels 13 and 22, and to rotate the shaft 24 in response to rotation of the worm wheel 13 in one direction. To effect this latter function, the hub 30 has a ratchet flange 31 (Fig. 3) adjacent the worm wheel 13, which ratchet flange is engaged by a pawl 32 pivotally mounted on the worm wheel 13 by a pivot pin 33 and urged against the ratchet flange 31 by a spring 34. When the worm wheel 13 is rotated counter-clockwise (with reference to Fig. 3), the pawl 32 engages the ratchet flange 31 and rotates the latter and the shaft 24. However, when the worm wheel 13 rotates in the opposite direction, the pawl 32 slips on the ratchet flange.

The worm wheel 22 is similarly coupled to the sleeve 26 by a ratchet mechanism so that when the worm wheel 22 is rotated clockwise (Fig. 4), a pawl 35 on wheel 22 engages a ratchet flange 36 on a hub 37 which is locked to the sleeve 26 by a set screw 38.

It will be apparent therefore, that when the motor 19 is rotated in a first direction to rotate the worm wheels 13 and 22 clockwise (with reference to Figs. 3 and 4), the worm wheel 22 drives the sleeve 26 clockwise while the worm wheel 13 idles without driving the shaft 24. On the other hand, when the motor 19 runs in the opposite or second direction to rotate the worm wheels 13 and 22 counter-clockwise, the worm wheel 13 rotates the shaft 24 while the worm wheel 22 idles with respect to sleeve 26.

The selecting mechanism comprises a hollow drum 39 secured to the sleeve 26 by an end wall 40, and adapted to be rotated by the sleeve 26. Positioned within the rotatable hollow drum 39 is a stationary hollow drum 41, this drum being supported at its right end by screws 42 from a panel 43, which in turn is supported by bolts 44 and spacer tubes 45 (Figs. 1 and 6) from the frame member 28. Positioned within the stationary hollow drum 41 and mounted on the shaft 24 for rotation therewith, are a plurality of selector discs 46, which discs cooperate with selector pins 47 slidable radially in guide apertures provided therefor in the stationary drum 41, and controlled by the outer rotatable hollow drum 39.

The selector discs 46 are normally clamped to the shaft 24 for rotation therewith, but the discs are adapted to be rotatably adjusted on the shaft to determine the angular positions in which the shaft is to be stopped. To this end, the selector discs 46 have round apertures therein freely fitting the shaft 24, but the shaft has a longitudinal key way 48, and the selector discs 46 are separated by spacer discs 49 (Fig. 6), each of which has a tongue 50 which fits in the key way 48 so that the spacer discs always rotate with the shaft. The stack of selector discs 46 and spacer discs 49 is normally compressed on the shaft 24 between a shoulder 51 and a compression nut 52, which is threaded onto the right end of the shaft and extends through an aperture 53 provided therefor in the panel 43 so that it can be tightened or loosened from the front (right with reference to Fig. 2) side of the panel. The procedure for adjustably rotating the selector discs 46 during adjustment will be described later.

During each cycle of operation of the mechanism, one of the selector pins 47 is projected inwardly against the rim of its associated selector disc 46 (Fig. 5) so that during counter-clockwise rotation of the shaft 24 and the discs 46, a shoulder 461 on the cooperating selector disc is engaged by the pin 47, thereby stopping the shaft 24 in a desired position. The pins 47 are normally maintained in outer positions, in which they do not drag on the selector discs 46, by crescent-shaped springs 55, one for each pin, which extend through apertures provided therefor in the stationary drum 41, which may be provided with grooves 56 for receiving and guiding the ends of the springs. One of the pins 47 and its associated spring 55 are shown in their normal, or retracted, positions in Fig. 6, and in the inner, or selecting, positions in Fig. 5.

Obviously, the pins 47 are retained in their outer, retracted, positions by their springs 55, except when the pins are forced inwardly by some additional force. This additional force is provided by selector springs 57, which are secured to and rotate with the hollow drum 39. Each spring 57 extends through a complete revolution and lies partially within a shallow groove in the inner surface of the drum, as shown in Fig. 2, and has one end 571 rigidly secured to the drum so that it must rotate therewith. The other end 572 of each selector spring is bent inwardly so that when it is positioned opposite its associated selector pin 47, it urges the pin into its inner position as shown in Fig. 5, when the associated selector disc 46 moves into position to permit such movement. Each groove in the inner surface of the hollow drum 39 is deepened, as indicated at 58, to make room for the spring while the associated pin 47 is riding on the high portion of its associated disc 46.

It will be observed from inspection of Fig. 5 that there are 12 of the selector springs 57, and that their inwardly bent ends 572 are circumferentially spaced at equal distances from each other. It will also be observed from Fig. 2 that the twelve selector pins 47 are aligned longitudinally. Therefore any one of the selector springs 57 can be brought into operative relation with its associated selector pin 47 by rotating the drum 39 into a desired one of twelve different positions. Thereafter, rotation of the shaft 24 and the discs 46 in counterclockwise direction will carry the shoulder 461 on the selected disc 46 into contact with the operative selector pin 47 and thereby stop the shaft in the selected position.

It is important to note that although twelve different positions of the shaft 24 are selectable by rotating the drum 39 into any one of twelve equally spaced positions, the twelve different positions into which the shaft can be stopped are completely unrestricted as to their spacing. By suitably adjusting the positions of rotation of the selector discs 46 on the shaft 24, any desired twelve angular positions of the shaft can be obtained.

As previously indicated, an advantage of the present invention is that it can be adjusted very readily and without obtaining access to the mechanism back of the panel 43. Thus, to adjust any one of the selector discs 46, it is merely necessary to: first loosen the compression nut 52 so that the selector discs 46 can turn with respect to the shaft 24, although it is desirable to leave some frictional resistance to rotation (by not completely loosening the compression nut 52); second, rotate the outer drum 39 into position in which the pin 47 associated with the selector disc 46 to be adjusted is juxtaposed to the end 572 of its associated spring 57; third, rotate the shaft 24 counter-clockwise into the desired position of adjustment; and fourth, tighten the compression nut 52.

Adjustment of any selector disc 46 cannot change the adjustment of any other disc, because the spacer discs 49 are keyed to the shaft 24 so that they always rotate with the shaft, and the friction between the spacer discs and the selector discs causes all of the selector discs to rotate with the shaft except when one of the selector discs (the one being adjusted) is restrained from rotation by contact of its shoulder 461 with the associated selector pin 47.

To enable the operator to determine the position of the drum 39, the latter is provided with indicia 59 on its front edge (Fig. 7), and the position of the drum is indicated by display of the indicium representing the position of the drum through a window 60 in the panel 43. The position of the shaft 24 is indicated by indicia 51 on the dial 25.

The reversible motor 19 is adapted to be operated first in said one direction to rotate the hollow drum 39 into a selected position, and then in said second, opposite direction to carry the shaft 24 into the position determined by the setting of the selector disc 46 that is rendered active in the selected position of the hollow drum 39. A convenient control system for automatically controlling the motor is shown in the schematic diagram of Fig. 9.

Referring to Fig. 9, the motor 19 is shown of the permanent magnet type which runs in one direction or the other according to the polarity of the current applied thereto. One terminal of the motor 19 is connected to contacts 623 and 624 of a fast acting relay 62. The other terminal of the motor 19 is connected through the armature 631 and front contact 632 of a slow release relay 63 to contacts 621 and 626 of the relay 62. The windings of the relays 62 and 63 are connected between ground and a brush 642, which makes contact at all times with a contact drum 64, having a plurality of brushes 643 bearing thereon, which are adapted to be connected to corresponding contacts 661 of a master control switch 66 having a movable contact 662 connected to one terminal of a current source 67, the other terminal of which is grounded. The one terminal of the source 67 is also connected to an armature 622 of the relay 62, and another armature 625 of relay 62 is connected to ground. The arrangement provides for remote control of the selecting mechanism, since the master control switch 66 can be located at any desired point.

The contact drum 64 (Fig. 8) contacts the brush 642 at all times, but has an insulating segment 641 which rides under a different one of the brushes 643 in each of twelve different positions of the drum. The contact drum 64 is mounted on the sleeve 26 (Fig. 2) for rotation with the hollow drum 39. As will appear later, when the insulating segment 641 is positioned under one of the brushes 643, the drum 39 is in one of its selected positions, in which the end 572 (Fig. 5) of one of the springs 57 is engaging its associated selector pin 47.

A cycle of operation will now be outlined. Assume that the movable contact 662 of the master switch 66 is moved from the position shown in Fig. 9 into a new position in which it contacts a different one of the contacts 661. This completes a circuit from ground through the source 67, through the movable contact 662 of the master switch 66 to the newly selected stationary contacts 661 thereof, thence to the corresponding brush 643 of the contact drum 64, and through the drum to the brush 642, and thence through the relays 62 and 63, which are immediately operated. The energization of relay 62 completes a circuit from ground through the source 67 over the armature 622 and contacts 621 of relay 62, and thence through the contact 632 and armature 631 of relay 63 (which was energized simultaneously with relay 62), to motor 19, and thence over contact 624 and armature 625 of relay 62 to ground, causing the motor 19 to run in the said first direction to rotate the worm wheels 13 and 22 clockwise. The pawl 32 of worm wheel 13 ratchets over its associated ratchet flange 31 so that the shaft 24 is not rotated; but the worm wheel 22 drives the ratchet flange 36 and the sleeve 26, thereby rotating the contact drum 64 and the hollow drum 39. This rotation continues until the insulating segment 641 of the drum 64 rides under that one of the brushes 643 that is energized by the master switch 66, whereupon the energizing circuits of the relays 62 and 63 are broken. Relay 62 releases immediately, but the slow release relay 63 holds up for a predetermined interval. The release of relay 62 causes its armature 622 to break from contact 621 and make on contact 623, and causes the armature 625 to break from contact 624 and make on contact 626. This reverses the direction of current flow to the motor 19, causing the motor to reverse its direction and run in said second direction during the remainder of the predetermined time required for the slow release relay 63 to open the motor circuit at its contact 632.

When the motor reverses, it drives the worm wheels 13 and 22 in counter-clockwise direction (with respect to Figs. 3 and 4), under which condition the worm wheel 13 drives the shaft 24, but the worm wheel 22 does not drive the sleeve 26. The worm wheel 13 continues to rotate the shaft 24 in counter-clockwise direction until the selector pin 47 (Fig. 5) that was engaged by the end 572 of its associated selector spring 57 engages against the shoulder 461 of its associated selector disc 46, which stops the shaft 24 in the desired selected position. Such stoppage is possible because of the interpositioning of the slip clutch 15 between the shaft 16 and the worm 14.

The slow release relay 63 is so designed as to hold its armature 631 against its contact 632 for a sufficient length of time to insure the running of the motor 19 in said second direction long enough to rotate the shaft 24 and the selector disc 46 through a complete revolution, following the movement of the hollow drum 39 into selecting position. Thereafter, the release of the relay 63 opens the motor circuit so that the mechanism remains in the selected position until the master switch 66 is again manipulated to select a new position, whereupon the cycle of operations described will be repeated.

For the purpose of explaining the invention, a specific embodiment thereof has been disclosed and described in detail, but it will be obvious to those skilled in the art that numerous departures from the exact construction described can be made without departing from the invention which is to be limited only to the extent set forth in the appended claims.

I claim:
1. A mechanism of the type described comprising: a first rotatable member to be rotated into any one of a plurality of selectable angular positions; a second rotatable member; a first set of rotatable stop elements secured to said first rotatable member for rotation therewith; a second set of stop elements, each of which is operably associated with a different one of said first set of stop elements and movable between an inoperative position in which it is out of the path of rotation of its associated rotatable stop element and an operative position in which it intercepts and blocks rotation of its associated rotatable stop element; means selectively responsive to rotation of said second rotatable member into different angular positions for moving different stop elements of said second set into their operative positions; means for rotating said second member into a selected position; and means responsive to rotation of said second member into said selected position for rotating said first member until that one of said second stop elements corresponding to the selected position of said second member intercepts and blocks the associated stop element of said first set, said means for rotating said first and second rotatable means comprising: a reversible electric motor; one-way clutch means coupling said motor to said second rotatable member whereby said motor drives said second rotatable member in response to rotation of said motor in one direction; one-way clutch means coupling said motor to said first rotatable member whereby said motor drives said first rotatable member in response to rotation of said motor in the opposite direction; and means for selectively operating said motor first in said one direction and then in said opposite direction.

2. A mechanism according to claim 1 in which said means for selectively operating said motor first in said one direction and then in said opposite direction comprises: an energizing source for said motor; a starting switch and a reversing switch for electrically connecting said source to said motor; means for closing said starting switch and actuating said reversing switch to cause said motor to run in one direction; means responsive to movement of said second rotatable member into a selected position for actuating said reversing switch to reverse said motor; and means for opening said starting switch at a predetermined interval following actuation of said reversing switch.

3. A mechanism of the type described comprising: a first rotatable member to be rotated into any one of a plurality of preselected angular positions, and having a first set of axially spaced stop elements each having a peripheral shoulder; a second hollow rotatable member disposed in spaced relation about said first member; a stationary member disposed between said first and second rotatable members; a second set of stop elements supported by said stationary member for substantially radial movement, each operably associated with a different one of said first set of stop elements and movable between an inoperative position in which it is out of engagement with its associated rotatable stop element, and an operative position in which it is capable of engaging the peripheral shoulder of its associated rotatable stop element; and means selectively responsive to rotation of said second rotatable member into different angularly spaced positions for moving different stop elements of said second set into their operative positions and including a plurality of spring elements, one for each pair of stop elements, and each adapted to bear against and yieldably urge its associated stop element of said second set into engagement with its associated rotatable stop element in a different rotative position of said second member; said stationary member for radially supporting said second set of stop elements having circumferentially extending grooves alined with said stop elements; and a leaf spring for each said stop element engaging its stop element intermediate its ends and having its ends resting in the groove alined with that stop element, said leaf springs urging said associated stop elements into their inoperative positions and having spring force less than that of the said spring element of said second rotatable member, whereby it is overcome by the latter to permit actuation of its stop element.

4. A mechanism of the type described comprising: a first rotatable member to be rotated into any one of a plurality of preselected angular positions, and having a first set of axially spaced stop elements each having a peripheral shoulder; a second hollow rotatable member disposed in spaced relation about said first member; a stationary member disposed between said first and second rotatable members; a second set of stop elements supported by said stationary member for substantially radial movement, each operably associated with a different one of said first set of stop elements and movable between an inoperative position in which it is out of engagement with its associated rotatable stop element, and an operative position in which it is capable of engaging the peripheral shoulder of its associated rotatable stop element; and means selectively responsive to rotation of said second rotatable member into different angularly spaced positions for moving different stop elements of said second set into their operative positions and including a plurality of spring elements, one for each pair of stop elements, and each adapted to bear against and yieldably urge its associated stop element of said second set into engagement with its associated rotatable stop element in a different rotative position of said second member; said second rotatable member having circumferentially extending grooves in its inner surface, said spring elements being at least partially positioned in and located by said grooves.

HAMILTON A. STAMPER.

REFERENCES CITED

The following references are of record in the file of this patent:

UNITED STATES PATENTS

| Number | Name | Date |
|---|---|---|
| 1,930,160 | Crilly | Oct. 10, 1933 |
| 1,974,207 | Ellinger | Sept. 18, 1934 |
| 2,165,226 | Collins | July 11, 1939 |
| 2,174,552 | Collins | Oct. 3, 1939 |
| 2,216,272 | Kaye | Oct. 1, 1940 |
| 2,391,470 | May | Dec. 25, 1945 |
| 2,396,714 | May | Mar. 19, 1946 |